United States Patent
Monbaliu et al.

[11] 3,767,412
[45] Oct. 23, 1973

[54] POLYMERIC COLOUR COUPLERS AND THEIR USE IN COLOUR PHOTOGRAPHY

[75] Inventors: Marcel Jacob Monbaliu, Mortsel; Armand Maria Van Den Bergh, Berchem; Jan Jozef Priem, Mortsel, all of Belgium

[73] Assignee: Agfa-Gevaert N.V., Mortsel, Belgium

[22] Filed: Nov. 9, 1971

[21] Appl. No.: 197,167

[30] Foreign Application Priority Data
Dec. 16, 1970 Great Britain............... 59,720/70

[52] U.S. Cl. .................................. 96/100
[51] Int. Cl............................... G03c 1/40
[58] Field of Search....................... 96/100, 114

[56] References Cited
UNITED STATES PATENTS
2,852,381  9/1958  Minsk et al. ................. 96/100
3,551,157  12/1970  Salminen ..................... 96/100

Primary Examiner—Norman G. Torchin
Assistant Examiner—Richard L. Schilling
Attorney—Alfred W. Breiner

[57] ABSTRACT

Polymeric colour couplers for use in photographic silver halide colour emulsions are described which comprise recurring units of the formula:

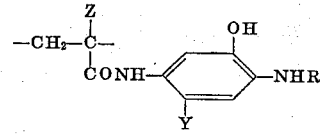

wherein:
  Z is hydrogen or $C_1$-$C_4$ alkyl,
  Y is hydrogen or halogen and
  R is alkoxycarbonyl, alkylcarbamoyl or an aliphatic aromatic or heterocyclic carboxylic acid or sulphonic acid acyl group.

These colour couplers have no effect on the viscosity of the emulsions, show no crystallization tendency and yield upon colour development dye images with high stability against heat and humidity.

5 Claims, No Drawings

POLYMERIC COLOUR COUPLERS AND THEIR USE IN COLOUR PHOTOGRAPHY

The present invention relates to coulour photography, more particularly to polymerisable monomeric colour couplers, to addition polymers and copolymers derived therefrom, and to photographic light-sensitive silver halide material containing these products.

It is known that for the production of a photographic colour image in a light-sensitive silver halide emulsion layer the exposed siliver halide is developed to a silver image by means of an aromatic primary amino compound in the presence of a colour coupler which by reaction with the oxidized developer forms a dye on the areas corresponding with the silver image.

In order to be useful for producing colour images, the colour couplers should meet various requirements. For instance it is essential that colour couplers when incorporated in photographic light-sensitive silver halide emulsions remain immobile and do not wander or diffuse through the emulsion from their original site otherwise colour separation will be imperfect and result in final dye images that are degraded. Further, they should possess favourable spectral properties and produce on colour development dyes having a high stability against light, heat and humidity.

In U.S. Pat. specification Nos. 2,772,162 and 3,222,176 and United Kingdom Pat. specification No. 975,773 cyan-forming diacylamino-phenol couplers have been described and claimed which on colour development produce dyes having a favourable stability against heat and humidity. Unfortunately, these compounds are very difficult to incorporate into hydrophilic colloid media such as a gelatino silver halide emulsion. As a matter of fact, when such colour couplers are provided with salt-forming groups such as carboxyl or sulpho groups so that they can be dissolved in the emulsions in the form of their soluble alkali salts they increase the viscosity of the emulsions and when they are used in their hydrophobic form, i.e., having no salt-forming groups so that they have to be dispersed in the emulsion in the form of a solution in a low-boiling water-immiscible solvent, which is removed afterwards, or in the form of a solution in a high-boiling water-immiscible solvent known as oil-former, which is left in the emulsion, they also give rise to a viscosity increase of the emulsion. This is rather surprising since normally when using hydrophobic colour couplers that are dispersed into photographic emulsions according to these techniques, the viscosity is not influenced. In addition thereto these hydrophobic colour couplers show a strong tendency to crystallization in the emulsion. Moreover, though these hydrophobic diacylaminophenol coulour couplers are provided with high molecular weight radicals to render them fast to diffusion in the hydrophilic colloid medium it was experienced that, unlike naphthol colour couplers, these phenol colour couplers are still more or less diffusible.

Therefore, in accordance with the present invention polymerisable monomeric diacylaminophenol colour couplers are provided from which high molecular weight colour coupling compounds can be made that are fast to diffusion in hydrophilic colloid media, that can be incorporated into said media in such a way that there is no increase of the viscosity of the colloid medium, that show no crystallization tendency and yield upon colour development with an aromatic primary amino colour developing agent dye images having a high stability against heat and humidity.

The monomeric colour couplers provided according to the present invention can be represented by the following general formula I: I

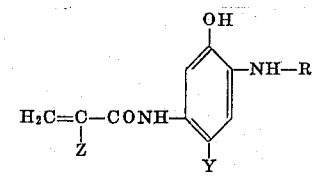

wherein:
Z stands for hydrogen or $C_1$-$C_4$ alkyl such as methyl,
Y stands for hydrogen or halogen such as chlorine,
R stands for alkoxycarbonyl for example ethoxycarbonyl, alkylcarbamoyl for example butylcarbamoyl, or an aliphatic, aromatic or heterocyclic carboxylic acid or sulphonic acid acyl group which can be represented by -X-$R_1$ wherein X is carbonyl or sulphonyl and $R_1$ is alkyl, for example methyl, n-butyl, t-butyl, isooctyl and n-pentadecyl, substituted alkyl for example aryloxy substituted alkyl, aryl, substituted aryl for example substituted by halogen such as chlorine, alkyl such as methyl, isobutyl and isoamyl, alkyloxy such as methoxy, a heterocycle for example furyl and thienyl or a substituted heterocycle.

The polymeric colour couplers provided according to the present invention comprise recurring units of the following formula II.

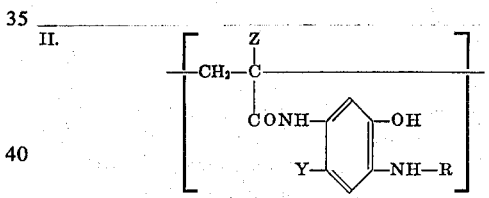

wherein: Z, Y and R have the same significance as above, and are derived from the above monomeric colour couplers by homopolymerization of the above monomeric colour couplers or by copolymerization of these monomeric colour couplers with one or more non-colour forming monomers containing at least one ethylenic group, for example acrylic acid, α-chloroacrylic acid, α-alkacrylic acids, wherein the substituting alkyl contains from 1 to 4 carbon atoms e.g. methyl, ethyl and n-propyl, the esters and amides derived from acrylic acid, α-chloroacrylic acid and these α-alkacrylic acids, such as acrylamide, methacrylamide, ethyl acrylate, n-butyl acrylate, 2-ethylhexyl acrylate and lauryl methacrylate, vinyl esters such as vinyl acetate, vinyl propionate and vinyl laurate, acrylonitrile, methacrylonitrile, aromatic vinyl compounds such as styrene and its derivatives, e.g. vinyl toluene, vinyl acetophenone and sulphostyrene, itaconic acid, citraconic acid, crotonic acid, vinylidene chloride, vinyl alkyl ethers such as vinyl ethyl ether, maleic acid esters, N-vinyl-2-pyrrolidone, N-vinylpyridine, 2- and 4-vinyl-pyridine, etc.

The ethylenically unsaturated monomers suitable for being copolymerized with the monomeric phenol colour couplers corresponding to the above general formula I can be chosen so that the physical and/or chemical properties of the resulting copolymer such as its solubility, its compatibility with the binder of a photographic colloid composition into which it is intended to be incorporated, its flexibility, its thermal stability, etc., are favourably infleunced. For instance it is possible to introduce plasticizing groups in the copolymeric colour coupler by using a comonomer carrying such groups which results in a favourable influencing of the brittleness and flexibility of the layers into which the copolymer is intended to be incorporated.

The present invention further provides colour forming photographic compositions and materials containing the above polymeric colour couplers as well as the production of colour images by colour developing an exposed photographic silver halide material in the presence of a polymeric colour coupler as defined above.

The monomeric phenol colour couplers corresponding to the above general formula I can be prepared in a very simple way by allowing to react an acid halide of acrylic acid or an α-substituted acrylic acid such as acryloyl and methacryloyl chloride with the appropriate 5-aminophenol compound carrying in the 2-position the group -NHR wherein R has the same significance as in formula I. The acylation can be effected according to the classical methods known in the art and as illustrated hereinafter. The 5-aminophenol compounds are prepared by catalytic reduction of the corresponding 5-nitrophenol compounds which in their turn are prepared by reaction of 2-amino-5-nitrophenol with the appropriate acyl chloride, chloroformic acid ester or isocyanate for instance as described in U.S. Pat. specification Nos. 2,772,162 and 3,222,176 and United Kingdom Pat. specification No. 975,773 and as illustrated in the preparations hereinafter.

The polymeric colour couplers according to the present invention can be prepared by conventional addition polymerisation reactions.

Preference is given to emulsion polymerisation techniques wherein the usual addition polymerisation initiators are used and according to which latices are obtained which can be used as such for incorporating the polymeric colour couplers into ligh-sensitive materials. Interesting emulsion polymerisation techniques are for instance described in Belgian Pat. specification No. 669,971 according to which latices are formed of polymeric colour couplers by emulsion polymerisation in aqueous gelatin, and in United Kingdom Pat. specification No. 1,130,581 according to which latices are formed of polymeric colour couplers by emulsion polymerisation in water. As described in the latter Patent Specification the processes can be applied to the formation of homopolymers and to the formation of copolymers. In the latter case the comonomer may be a liquid comonomer and may in some cases serve as solvent for the normally solid monomer. The comonomer may be selected to confer predetermined required properties on the eventual water-insoluble polymer.

These and other data including e.g. examples of polymerisation initiators, emulsifying agents and suitable solvents as well as instructions relating to the formation of the initial emulsions and/or suspensions are fully set out in the said United Kingdom Pat. specification and need not be repeated here in detail.

Amongst the polymerisation initiators suitable for use in the above emulsion polymerisation process may be mentioned: persulphates such as ammonium and potassium persulphate, azonitrile compounds such as the sodium salt of 4,4'-azo-bis(4-cyanovaleric acid) as well as peroxide compounds such as benzoyl peroxide, hydrogen peroxide.

As is described in the above United Kingdom Pat. specification surface active compounds of various classes and known per se are available for use as emulsifying agents, amongst others soaps, sulphonates and sulphates, cationic and amphoteric compounds and high molecular weight protective colloids.

The latices obtained generally comprise between about 2 and about 50 percent by weight of polymeric colour coupler in respect of the total amount of latex.

The polymeric colour couplers according to the present invention can be characterized by their so-called equivalent molecular weight. By equivalent molecular weight is understood the number of grams of polymer containing 1 mole of polymerized monomeric colour coupler. It can be compared with the molecular weight of the non-polymeric classical non-migratory colour couplers. The equivalent molecular weight of the polymeric colour couplers according to the invention can vary within very wide limits, preferably however from about 220 to about 2,000.

The following preparations illustrate how the monomeric colour couplers can be made as well as the formation of the polymeric colour couplers in the form of latices.

Preparation 1 a. 2-methylsulphonylamino-5-nitrophenol

To 800 ml of dioxane, 220 g (1.65 mole) of anhydrous aluminium chloride were added with stirring. After having stirred the mixture for 15 min. a light yellow solution was obtained to which 1.5 mole of 2-amino-5-nitrophenol was added. Then, 189 g (1.65 mole) of methane sulphochloride and 181 ml of pyridine were added dropwise. The temperature rose to the reflux temperature and the mixture was kept refluxing for 2 hours. The reaction mixturre was then poured into ice-water and the precipitate was filtered off and dried.

Yield: 282 g (84 percent).

Melting point: 181° C.

b. 2-methylsulphonylamino-5-aminophenol 104.5 g (0.45 mole) of 2-methylsulphonylamino-5-nitrophenol, dissolved in 300 ml of dioxane were reduced at 75° C under hydrogen pressure using 4.5 ml of Raney nickel as catalyst. After 2 hours, the solution was poured into dichloromethane and the precipitate formed was filtered off.

Yield : 73. 5 g (81 percent).

Melting point : 163° C.

c. 2-methylsulphonylamino-5-methacrylaminophenol

In a reaction vessel, 101 g (0.5 mole) of 2-methylsulphonyl-amino-5-aminophenol were dissolved in 500 ml of dioxane and 5 ml of nitrobenzene. 46.2 g (0.55 mole) of sodium hydrogen carbonate were added whereupon the mixture was heated to 60° C and 53.5 ml (0.55 mole) of methacryloyl chloride were added dropwise in 1 hour.

The viscous mixture was then refluxed for 1 h 30 min. whereupon it was poured into 2 litres of water. The precipitate formed was filtered off, purified by stirring in 400 ml of methanol and then dried after having filtered off the methanol.

Yield : 116 g (86 percent).
Melting point : 220° C.

Preparation 2

2-methylsulphonylamino-5-acryloylaminophenol

To a solution of 404 g (2 mole) of 2-methylsulphonyl-amino-5-aminophenol in 2 litres of dioxane and 20 ml of nitrobenzene, 201.6 g (2.4 mole) of sodium hydrogen carbonate were added. The mixture was heated to 50°–60° C whereupon in 1 hour 217 g (2.4 mole) of acryloyl chloride were added. The viscous mixture was heated for 3 hours on a boiling water-bath and then poured into 10 litre of water. The precipitate was filtered off, boiled in 1,000 ml of methanol and filtered while hot.

Yield : 415 g (81 percent).
Melting point : 260° C.

Preparation 3

2-methylsulphonylamino-4-chloro-5-methacryloylaminophenol

To a suspension of 270 g (1 mole) of 2-methylsulphonyl amino-5-methacryloylaminophenol in 1,500 ml of acetic acid 101.8 ml (1.25 mole) of sulphuryl chloride were added in 30 min. The temperature rose to 50° C whereupon the mixture was kept for 2 hours at 60°–70° C. A strong evolution of sulphur dioxide and hydrogen chloride took place and the mixture remained heterogeneous. Upon cooling, the precipitate formed was filtered off, washed with water and dried.

Yield : 256 g (84 percent).
Melting point : 248° C.

Preparation 4

2-methylsulphonylamino-4-chloro-5-acryloylaminophenol

This compound was prepared according to the procedure of preparation 3 using 51.2 g of 2-methylsulphonylamino-5-acryloylaminophenol and 18 ml of sulphuryl chloride.

Yield : 44.5 g.
Melting point : > 250° C.

In the following table I are listed compounds prepared according to the procedure described in praparation 1. It was observed that sulphonylation of 2-amino-5-nitrophenol in the presence of aluminium chloride (procedure of preparation 1a)) leads to selective sulphonylation of the amino group, whereas in the absence of aluminum chloride sulphonylation occurs predominantly at the hydroyl group.

TABLE I

Structure:

OH
 |
 [benzene ring]—NHR
 |
R₂

| R | R₂ | Melting point (°C) |
|---|---|---|
| $C_6H_5SO_2-$ | $NO_2$ | 206 |
| | $NH_2$ | 175 |
| | $NHCOC(CH_3)=CH_2$ | 190 |
| | $NO_2$ | 205 |
| $4-Cl-C_6H_4-SO_2-$ | $NH_2$ | 202 |
| | $NHCOC(CH_3)=CH_2$ | 218 |
| $4-sec-C_4H_9-C_6H_4-SO_2-$ | $NO_2$ | 130 |
| | $NH_2$ | 124 |
| | $NHCOC(CH_3)=CH_2$ | 176 |
| | $NO_2$ | 184 |
| thienyl-$SO_2-$ | $NH_2$ | 144 |
| | $NHCOC(CH_3)=CH_2$ | 202 |
| $H_5C_2OCO-$ | $NO_2$ * | 179 |
| | $NH_2$ | 132 |
| | $NHCOC(CH_3)=CH_2$ | 185 |
| $n-H_9C_4NHCO-$ | $NO_2$** | 180 |
| | $NH_2$ | 180 |
| | $NHCOC(CH_3)=CH_2$ | 196 |

\* 2-ethoxycarbonylamino-5-nitrophenol was prepared following the procedure of preparation 1a) i.e. with aluminium chloride as catalyst starting from 2-amino-5-nitrophenol and chloroformic acid ethyl ester.

\*\* 2-n-butylureido-5-nitrophenol was prepared following the procedure of preparation 1a) i.e. with aluminium chloride as catalyst starting from 2-amino-5-nitrophenol and butylisocyanate.

Preparation 5 a. 2-o-methylbenzoylamino-5-nitrophenol 154 g (1 mole) of 2-amino-5-nitrophenol were suspended in 1.5 litre of dry acetone and 100 g of sodium hydrogen carbonate. With stirring, 154.5 g (1mole) of 2-methylbenzoylchloride, were gradually added whereupon stirring was continued for 3 hours at room temperature. The precipitate formed was filtered off, washed with acetone and water and then dried.

Melting point : 265° C.

b. 2-o-methylbenzoylamino-5-aminophenol 2-o-methylbenzoylamino-5-nitrophenol was catalytically reduced according to the procedure of preparation 1(b).

The 2-o-methylbenzoylamino-5-aminophenol formed had a melting point of 185° C.

c. 2-o-methylbenzoylamino-5-methacryloylaminophenol

This compound was prepared from 2-o-methylbenzoylamino-5-aminophenol and methacryloylchloride according to the procedure of preparation 1 c).

Melting point : 185° C.

In the following table II are listed compounds prepared according to the procedure of preparation 5.

TABLE II $$\underset{R_2}{\text{OH}}\!\!-\!\!\underset{}{\bigcirc}\!\!-\!\!\text{NHCOR}_1$$

| $R_1$ | $R_2$ | Melting point (°C) |
|---|---|---|
| $CH_3-$ | $NO_2$ | > 260 |
|  | $NH_2$ | 146 |
|  | $NHCOC(CH_3)=CH_2$ | 236 |
| i-$C_8H_{17}-$ | $NO_2$ | 230 |
|  | $NH_2$ | 96 |
|  | $NHCOC(CH_3)=CH_2$ | 177 |
| t-$C_4H_9-$ | $NO_2$ | > 260 |
|  | $NH_2$ | 94 |
|  | $NHCOC(CH_3)=CH_2$ | 228 |
| $C_6H_5-$ | $NO_2$ | > 260 |
|  | $NH_2$ | 130 |
|  | $NHCOC(CH_3)=CH_2$ | 210 |
| 2-$CH_3C_6H_4$ | $NO_2$ | 265 |
|  | $NH_2$ | 185 |
|  | $NHCOC(CH_3)=CH_2$ | 185 |
| 3-$CH_3C_6H_4$ | $NO_2$ | 246 |
|  | $NH_2$ | 124 |
|  | $NHCOC(CH_3)=CH_2$ | 195 |
| 4-$CH_3OC_6H_4$ | $NO_2$ | 260 |
|  | $NH_2$ | 154 |
|  | $NHCOC(CH_3)=CH_2$ | 210 |
| 2-Cl-$C_6H_4-$ | $NO_2$ | 255 |
|  | $NH_2$ | 200 |
|  | $NHCOC(CH_3)=CH_2$ | 190 |
| 4-t$C_4H_9-C_6H_4-$ | $NO_2$ | > 260 |
|  | $NH_2$ | 156 |
|  | $NHCOC(CH_3)=CH_2$ | 18 |
| 2,4-di-t-amyl-$C_6H_4-O-\underset{\underset{C_2H_5}{\vert}}{CH}-$ | $NO_2$ | 260 |
|  | $NH_2$ | 136 |
|  | $NHCOC(CH_3)=CH_2$ | 207 |

Preparation 6 copolymer of butyl acrylate and 2-methylsulphonylamino-5-methacryl-oylaminophenol In a quickfit-reaction vessel of 10 litre fitted with stirrer, condenser, thermometer and two dropping funnels were placed : 200 ml of a 10 percent aqueous solution of the sodium salt of oleylmethyl tauride, 3,690 ml of demineralized water, 10 g of sodium chloride and 400 g of 2-methylsulphonylamino-5-methacryloylaminophenol.

The mixture was heated with gentle stirring to 50° C, treated with 120 g of butyl acrylate and then heated to 90° C. 25 ml of a 5 percent aqueous solution of the sodium salt of 4,4'-azo-bis(4-cyanovaleric acid) were added so that after 5 min. the polymerisation reaction started and the temperature rose to 95° C. After 30 min. 480 g of butylacrylate and 75 ml of a 5 percent aqueous solution of the sodium salt of 4,4'-azo-bis(4-cyanovaleric acid) were simultaneously added dropwise. The mixture was then refluxed for 30 min. and the latex formed concentrated by evaporation during 30 min. until volume of 4,200 ml was obtained. The little precipitate formed was filtered off and the latex diluted to 5,000 ml.

Concentration of solids per 100 ml of latex : 18.5 g.
Concentration of polymer per 100 ml of latex : 17.8 g.

Equivalent molecular weight : 675.

Preparation 7

Copolymer of styrene and 2-methylsulphonylamino-5-methacryloylamino-phenol 80 g of previously distilled styrene and 120 g of 2-methylsulphonylamino-5-methacryloylaminophenol were copolymerised as described in preparation 6 (without the use of sodium chloride).

Yield : 800 ml of latex.
Concentration of solids per 100 ml of latex : 19.4 g.
Concentration of polymer per 100 ml of latex : 18.0 g.

Equivalent molecular weight : 878.

Preparation 8

Terpolymer of methacrylic acid, butylacrylate and 2-methylsulphonylamino-5-methacryloylaminophenol In a 2 litre reaction vessel fitted with stirrer, condenser ahd thermometer were placed : 660 ml of demineralised water, 2 g of sodium chloride, and 80 g of 2-methylsulphonylamino-5-methacryloylaminophenol. The mixture was heated to 70° C and then treated with a mixture of 27 g of butylacrylate and 13.5 g of methacrylic acid. The temperature was raised to 90° C whereupon 25 ml of a 1 percent aqueous solution of the sodium salt of 4,4'-azo-bis(4-cyanovaleric acid) were added. Polymerisation started after 5–10 min. In about 30 minutes were then added, dropwise with gentle refluxing, 75 ml of a 1 percent aqueous solution of the sodium salt of 4,4'-azo-bis(4-cyanovaleric acid), 53 g of butyl acrylate and 26.5 g of methacrylic acid. Refluxing was continued for 30 minutes and the latex was concentrated by evaporation whereby residual methacrylic acid or butyl acrylate was removed.

Yield : 800 ml.
Concentration of solids per 100 ml of latex : 23.5 g.
Concentration of polymer per 100 ml of latex : 22.6 g.

Equivalent molecular weight : 675.

Preparation 9

Copolymer of butyl acrylate and 2-methylsulphonylamino-5-acryloylaminophenol

In a 1 litre quickfit reaction vessel fitted with stirrer, condenser and dropping funnel were placed : 340 ml of demineralised water, 10 ml of a 10 percent aqueous solution of the sodium salt of oleyl methyl tauride, 40 g of 2-methylsulphonylamino-5-acryloylaminophenol and 60 g of butyl acrylate.

The mixture was heated with stirring and while introducing nitrogen to 90°C. Then, 37.5 ml of a 2 percent aqueous solution of the sodium salt of 4,4'-azo-bis(4-cyanovaleric acid) were added at once and the mixture was refluxed for 30 min. Another 12.5 ml of the said solution of 4,4'-azo-bis(4-cyanovaleric acid) sodium salt were added whereupon the mixture was kept for 30 min. at the boiling temperature. The latex formed was concentrated by evaporation and filtered.

Yield : 400 ml.

Concentration of solids per 100 ml of latex : 15.6 g.

Concentration of polymer per 100 ml of latex : 15.1 g.

Equivalent molecular weight : 1,130.

Preparation 10

Copolymer of butyl acrylate and 2-methylsulphonylamino-4-chloro-5-methacryloylaminophenol.

A mixture of 300 ml of demineralised water, 50 ml of butyl acetate, 5 g of the sodium salt of oleyl methyl tauride, and 40 g of 2 methylsulphonylamino-4-chloro-5-methacryloylaminophenol was heated to 75° C. 12.5 ml of butyl acrylate were added whereupon the mixture was heated to 90° C and 12.5 ml of a 1 percent aqueous solution of the sodium salt of 4,4'-azo-bis(4-cyanovaleric acid) were added. Polymerisation began after 10 minutes and in 30 min. 37.5 ml of butyl acrylate and 37.5 ml of a 1 percent aqueous solution of the sodium salt of 4,4'-azo-bis(4-cyanovaleric acid ) were added. After 30 min. the latex obtained was concentrated by evaporation until a volume of 325 ml was obtained.

Concentration of solids per 100 ml of latex : 17.0 g.

Concentration of polymer per 100 ml of latex : 15.3 g.

Equivalent molecular weight : 1,360.

Preparation 11

Copolymer of butylacrylate and 2-benzoylamino-5-methacryloylaminophenol

In a reaction vessel of 1 litre were placed : 220 ml of demineralized water, 4.75 g of the sodium salt of oleyl methyl tauride, and 19 g of 2-benzoylamino-5-methacryloylaminophenol. The mixture was stirred for 50 min. at room temperature and under a nitrogen atmosphere whereupon it was heated to 94° C. Then, 8.5 g of butylacrylate and 3 ml of a 5 percent aqueous solution of the sodium salt of 4,4'-azo-bis(4-cyanovaleric acid) were added dropwise. Polymerisation began after 5 minutes whereupon at 95°–97° C, 20 g of butylacrylate and 1.5 ml of the 5 percent aqueous solution of the sodium salt of 4,4'-azo-bis(4-cyanovaleric acid) were added in 11 min. Then another 1.5 ml of the said 5 percent aqueous initiator solution was added whereupon the mixture was kept refluxing for 50 min. The latex was concentrated by evaporation and centrifuged for 20 hours at 2,000 r.p.m.

Yield : 250 ml

Concentration of solids per 100 ml of latex : 17.3 g.

Concentration of polymer per 100 ml of latex : 15.2 g.

Equivalent molecular weight : 790.

The polymeric colour couplers according to the present invention can be used in photographic colour materials since they do not migrate or diffuse in the water-permeable colloid binding agents e.g. gelatin. The non-migratory colour couplers of the invention are usually incorporated into the coating composition of a red-sensitized silver halide emulsion layer of a photographic multicolour material. However, the non-migratory colour couplers may also be added to the coating compositions of non-light-sensitive colloid layers which are in water-permeable relationship with the said light-sensitive silver halide emulsion layer. This incorporation can be effected according to any technique known by those skilled in the art for incorporating polymeric photographic colour couplers into colloid compositions.

For instance, the polymeric colour forming compounds according to the present invention can be dissolved in water, in water-miscible or water-immiscible solvents or mixtreus of solvents whereupon the solution obtained is dissolved or dispersed, possibly in the presence of a wetting or dispersing agent, in a hydrophilic colloid composition forming or forming part of the binder material of the colloid layer. The hydrophilic colloid composition of course may comprise in addition to the colloid carrier all other sorts of ingredients.

The polymeric colour forming compounds according to the present invention can also be incorporated into hydrophilic colloid compositions in the form of latices, primary latices as well as secondary latices. By primary latices is understood latices prepared directly by emulsion polymerisation in aqueous medium of monomers (cfr. Belgian Pat. specification No. 669,971 and United Kingdom Pat. specification No.1,130,581 already referred to above with regard to the preparation of the polymeric colour formers) contrary to secondary latices which are obtained by dispersing in water pre-formed polymer colour formers. These secondary latices can for instance by prepared by dissolving the polymeric colour former in an organic medium immiscible with water, dispersing the resulting solution in water and distilling the organic solvent whilst stirring.

The solutions of said colour former or the colour former latices need not necessarily be dispersed or dissolved directly in the coating composition of the silver halide emulsion layer or other water-permeable layer. Said solution may advantageously be first dispersed or dissolved in an aqueous non-light-sensitive hydrophilic colloid solution whereupon the resultant mixture, after the possible removal of the organic solvents employed, is intimately mixed with the said coating composition of the light-sensitive silver halide emulsion layer or other water-permeable layer just before coating.

Although it is not our intention to limit the invention as to the way in which the polymeric colour formers of the invention are incorporated into photographic hydrophilic colloid compositions preference is given to latices more particularly to primary latices for the reasons set forth below. Indeed, latices may contain a high percentage of polymer e.g. concentrations up to 50 percent and nevertheless still posses a relatively low viscosity; when incorporating said latices into emulsions the viscosity of the latter is not influenced. Moreover, by the use of latices there can be dispensed with the use of organic solvents or alkaline solutions as well as with special dispersing techniques for incorporating the colour forming compounds.

Because of their compatibility with gelatin, the colour couplers according to the invention in primary latex form are very suitable for producing extremely transparent photographic materials, displaying excellent photographic properties such as image sharpness. Owing to the very small particle size of the latex particles the polymeric colour formers of the invention can be developed in the usual aqueous developing baths giving normal colour intensities in common development times.

The colour couplers according to the invention may be used in conjunction with various kinds of photographic emulsions. Various silver salts may be used as the sensitive salt such as silver bromide, silver iodide, silver chloride or mixed silver halides such as silver chlorobromide, silver bromoiodide and silver chlorobromoiodide.

The hydrophilic colloid used as the vehicle for the silver halide may be, for example, gelatin, colloidal albumin, zein, casein, a cellulose derivative, a synthetic hydrophilic colloid such as polyvinyl alcohol, poly-N-vinyl pyrrolidone, etc. If desired, compatible mixtures of two or more of these colloids may be employed for dispersing the silver halide.

The light-sensitive silver halide emulsions of use in the preparation of a photographic material according to the present invention may be chemically as well as optically sensitized.

They may be chemically sensitized by effecting the ripening in the presence of small amounts of sulphur containing compounds such as allyl thiocyanate, allyl thiourea, sodium thiosulphate, etc. The emulsions may also be sensitized by means of reductors for instance tin compounds as described in French Pat. specification No. 1,146,955 and in Belgian Pat. specification No. 568,687, imino-amino methane sulphinic acid compounds as described in United Kingdom Pat. specification No. 789,823 and small amounts of noble metal compounds such as gold, platinum, palladium, iridium, ruthenium and rhodium. They may be optically sensitized by means of cyanine and merocyanine dyes.

The said emulsions may also comprise compounds which sensitize the emulsions by development acceleration for example compounds of the polyoxyalkylene type such as alkylene oxide condensation products as described among others in U.S. Pat. specification Nos. 2,531,832 and 2,533,990, in United Kingdom Pat. specification Nos. 920,637, 940,051, 945,340 and 991,608 and in Belgian Pat. specification No. 648,710 and onium derivatives of amino-N-oxides as described in United Kingdom Pat. specification No. 1,121,696.

Further, the emulsions may comprise stabilizers e.g. heterocyclic nitrogen-containing thioxo compounds such as benzothiazoline-2 thione and 1-phenyl-2-tetrazoline-5-thione and compounds of the hydroxytriazolopyrimidine type. They can also be stabilized with mercury compounds such as the mercury compounds described in Belgian Pat. specification Nos. 524,121 and 677,337, United Kingdom Pat. specification No. 1,173,609 and in U.S. Pat. specification No. 3,179,520.

The light-sensitive emulsions may also comprise all other knids of ingredients such as plasticizers, hardening agents, coating aids, etc.

The polymeric colour couplers described in the present invention are usually incorporated into a red-sensitized silver halide emulsion for forming one of the differently sensitized silver halide emulsion layers of a photographic multilayer colour material. Such photographic multilayer colour material usually comprises a support, a red-sensitized silver halide emulsion layer with a cyan-forming colour coupler, a green-sensitized silver halide emulsion layer with a magenta colour former and a blue-sensitive silver halide emulsion layer with a yellow forming colour coupler. The polymeric colour couplers of the invention are also advantageously used in readiographic colour materials of the kind described in U.S. Pat. application Nos. 852,236 and 852,246.

The emulsions can be coated on a wide variety of photographic emulsion supports. Typical supports include cellulose ester film, polyvinylacetal film, polystyrene film, polyethylene terephthalate film and related films or resinous mateials, as well as paper and glass.

For the production of photographic colour images according to the present invention an exposed silver halide emulsion layer is developed with an aromatic primary amino developing substance in the presence of a polymeric colour former according to the present invetion. All colour developing agents capable of forming azomethine dyes can be utilized as developers. Suitable developing agents are aromatic primary amino compounds more particularly N,N-dialkyl-p-phenylene-diamines and derivatives thereof e.g. the toluene analogues examples of which are diethyl-p-phenylene diamine, 2-amino-5-diethylaminotoluene hydrochloride, N-butyl-N-sulphobutyl-p-phenylene diamine, 2-amino-5-[N-ethyl-N-($\beta$-methylsulphonylaminoethyl)amino] toluene sulphate, N-ethyl-N-$\beta$-hydroxyethyl-p-phenylene diamine, etc.

The following examples illustrate the present invention.

EXAMPLE 1

109 g of a silver bromoiodide emulsion (2.3 mole percent of iodide) which comprises per kg an amount of silver halide equivalent to 47 g of silver nitrate and 73.4 g of gelatin, are diluted with 185 g of a 7.5 percent aqueous solution of gelatin and 100 g of distilled water. To the emulsion obtained are added with stirring 23 ml of the latex prepared according to preparation 6 which corresponds with 0.006 mole of polymerised monomeric colour coupler. After the addition of the common additives such as stabilizers, wetting agents and hardeners the necessary amount of distilled water is added to obtain 575 g.

The emulsion obtained is coated on a cellulose triacetate support pro rata of 125 g per sq.m. The emulsion layer is dried and overcoated with a gelatin antistress layer.

After drying the material formed is exposed for 1/20 sec. through a continuous wedge with constant 0.30 and then developed for 10 min. at 24° C in a developing bath of the following composition:

| | |
|---|---|
| 2-amino-5-diethylaminotoluene hydrochloride | 3 g |
| Calgon | 2 g |
| anhydrous sodium sulphite | 4 g |
| anhydrous sodium carbonate | 17 g |

| | |
|---|---|
| potassium bromide | 2 g |
| water to make | 1 litre |
| | (pH : 10.65) |

The developed material is treated for 5 min. at 24° C in an acid hardening fixer of the following composition:

| | |
|---|---|
| water | 800 ml |
| anhydrous sodium thiosulphate | 200 g |
| sodium bisulphite | 12 g |
| glacial acetic acid | 12 ml |
| borax 10 aq. | 20 g |
| potassium alum | 15 g |
| water to make | 1000 ml |
| | (pH : 4.10) |

The material is rinsed for 10 min. with water and treated in a bleach bath of the following composition

| | |
|---|---|
| anhydrous potassium bromide | 20 g |
| potassium alum | 5 g |
| potassium dichromate | 5 g |
| water to make | 1 litre |
| | (pH : 3.1) |

After bleaching, the material is rinsed with water for 5 min. and treated for 5 min. at 24° C in the above acid hardening fixer.

After a final rinsing for 10 min. the material is dried.

A cyan coloured wedge image is obtained having an absorption maximum of 654nm.

EXAMPLE 2

A silver bromoiodide emulsion as described in example 1 is prepared with the difference, however, that the latex of preparation 6 is replaced by 18 ml latex of preparation 8 which corresponds with 0.006 mole of polymerised monomeric colour coupler.

The emulsion obtained is coated, exposed through a continuous wedge and processed as described in example 1.

A cyan coloured wedge image is obtained having an absorption maximum of 656 nm.

We claim:

1. A colour photographic element comprising a light-sensitive silver halide emulsion layer wherein the said emulsion layer or a non-light-sensitive water-permeable colloid layer in water-permeable relationship with the said emulsion layer comprises a homo-polymer or co-polymer having recurring units of the formula:

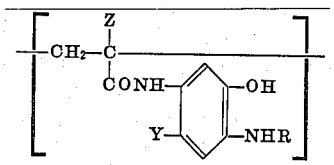

wherein:

Z is hydrogen or $C_1$-$C_4$ alkyl,

Y is hydrogen or halogen,

R stands for alkoxycarbonyl, alkylcarbamoyl or an aliphatic, aromatic or heterocyclic carboxylic acid or sulphonic acid acyl group, said co-polymer having said above-defined recurring units and recurring units derived from monomers having at least one ethylenic group, said homopolymer or co-polymer having an equivalent molecular weight of from about 220 to from about 2,000.

2. An element according to claim 1 wherein in the said formula R stands for -X-$R_1$ wherein X is carbonyl or sulphonyl and $R_1$ is an alkyl group, an aryl group or a heterocycle.

3. An element according to claim 1 wherein said emulsion layer is the red-sensitized silver halide emulsion layer of a multilayer colour element comprising three silver halide emulsion layers which are differently optically sensitized.

4. Process for the production of a photographic colour image by development of a photographic element containing imagewise exposed silver halide with the aid of a developing agent, which by reduction of the exposed silver halide is converted into its oxidized form and as such forms a cyan dye by reaction with at least one polymeric compound which is present in a silver halide containing layer or another colloid layer in water-permeable relationship therewith of the said photographic element and which comprises a homo-polymer or co-polymer having recurring units of the formula:

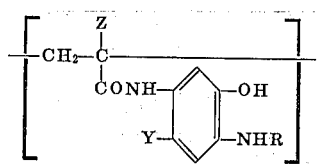

wherein:

Z is hydrogen or $C_1$-$C_4$ alkyl,

Y is hydrogen or halogen,

R stands for alkoxycarbonyl, alkylcarbamoyl or an aliphatic, aromatic or heterocyclic carboxylic acid or sulphonic acid acyl group, said co-polymer having said above-defined recurring units and recurring units derived from monomers having at least one ethylenic group, said homo-polymer or co-polymer having an equivalent molecular weight of from about 220 to from about 2,000.

5. Process according to claim 4, wherein in the said formula R stands for -X-$R_1$ wherein X is carbonyl or sulphonyl and $R_1$ is an alkyl group, an aryl group or a heterocycle.

* * * * *

UNITED STATES PATENT OFFICE
CERTIFICATE OF CORRECTION

Patent No. 3,767,412　　　　　　　　　　Dated October 23, 1973

Inventor(s) Marcel Jacob MONBALIU ET AL

It is certified that error appears in the above-identified patent and that said Letters Patent are hereby corrected as shown below:

Title page, in the heading, [30] Foreign Application Priority Data, the claim for priority should appear as follows:

-- Dec. 16, 1970　　Great Britain　　59,792/70 --.

Column 1, line 11, "siliver" should read -- silver --; Column 1, line 54, "coulour" should read -- colour --. Column 4, line 42, "mixturre" should read -- mixture --. Column 5, lines 45 - 46, "praparation" should read -- preparation --. Column 7, lines 52 - 57, in the Table II, under the heading "Melting point (°C)," "18" should read -- 218 --. Column 8, line 48, "ahd" should read -- and --. Column 10, line 27, "mixtreus" should read -- mixtures --; Column 10, line 45, "polymer" should read -- polymeric --. Column 11, line 1, "posses" should read -- possess --. Column 12, line 16, "readiographic" should read -- radiographic --; Column 12, line 23, "mateials" should read -- materials --; Column 12, line 29, "invetion" should read -- invention --.

Signed and sealed this 3rd day of December 1974.

(SEAL)
Attest:

McCOY M. GIBSON JR.　　　　　　　　　C. MARSHALL DANN
Attesting Officer　　　　　　　　　　　Commissioner of Patents